(12) United States Patent
Bruneau (10) Patent No.: US 8,638,060 B2
(45) Date of Patent: Jan. 28, 2014

(54) SOLAR PANEL ASSEMBLIES FOR ATTACHMENT TO A BOAT TRAILER

(76) Inventor: Steven Grant Bruneau, Tillamook, OR (US)

( * ) Notice: Subject to any disclaimer, the term of this patent is extended or adjusted under 35 U.S.C. 154(b) by 538 days.

(21) Appl. No.: 13/013,675

(22) Filed: Jan. 25, 2011

(65) Prior Publication Data

US 2011/0181018 A1    Jul. 28, 2011

Related U.S. Application Data

(60) Provisional application No. 61/336,767, filed on Jan. 26, 2010.

(51) Int. Cl.
*H02J 7/00* (2006.01)
(52) U.S. Cl.
USPC ............................ 320/101; 320/104; 320/113
(58) Field of Classification Search
USPC .................................. 320/101, 104, 107, 113
See application file for complete search history.

(56) References Cited

U.S. PATENT DOCUMENTS

| 2009/0079161 A1* | 3/2009 | Muchow et al. | 280/400 |
| 2010/0111660 A1* | 5/2010 | Mathews | 414/469 |

* cited by examiner

*Primary Examiner* — Edward Tso
*Assistant Examiner* — Aaron Piggush
(74) *Attorney, Agent, or Firm* — Baumgartner Patent Law; Marc Baumgartner (57) ABSTRACT

Solar panel assemblies herein are configured to couple to a boat trailer in order to charge a battery in a boat secured on top of the trailer. The solar panel assemblies can be configured to have means for 360 rotation to allow efficient sunlight capture and to allow for a more aerodynamic profile when the trailer is being towed. The assemblies herein include a solar panel housing that can include downwardly slanting sides to protect the one or more solar panels mounted within the housing from road debris.

3 Claims, 7 Drawing Sheets

SOLAR PANEL ASSEMBLIES FOR ATTACHMENT TO A BOAT TRAILER

CROSS-REFERENCE TO RELATED APPLICATIONS

This application claims priority to co-pending U.S. Provisional Application 61/336,767, filed on Jan. 26, 2010 which is expressly incorporated herein in its entirety.

FIELD OF THE INVENTION

The embodiments herein relate to solar panel assemblies configured to be attached to a boat trailer. More specifically, the teachings herein can be used to charge a battery operated watercraft coupled to and positioned on top of the boat trailer.

BACKGROUND

Watercraft have utilized solar energy to either fully power or supplement the boat's battery. See for example, U.S. Pat. Nos. 7,047,902, to Little, 6,805,064 to Andersen, and 6,000,353 to De Leu. As the above-listed patents show, these watercraft include designs that incorporate a solar panel positioned directly on the watercraft. This particular design strategy is disadvantageous for several reasons. Firstly, a solar panel positioned directly on the vehicle is susceptible to water or other damage while the watercraft is in use in the water. Additionally, the solar panels on these vehicles are stationary as opposed to rotatable or otherwise adjustable. Their immobility prohibits efficient capture of sunlight. Furthermore, the solar panels are only configured to allow charging of the vehicles they are positioned on, as opposed to additional vehicles. Additionally, the prior art solar panels do not allow for charging of the vehicles when a storage cover is placed over the watercraft as it would block the solar panel. Similarly, prior art solar panel exposure is limited to the particular parking limitations where the trailer is positioned, such that if it is parked under shade or cover, the solar panel cannot be adjusted to capture sunlight efficiently.

Accordingly, there is a need in the art to provide solar panel assemblies for charging electrical batteries in watercraft, that are not susceptible to water or other damage, are configured to efficiently capture sunlight, allow for the charging of more than one watercraft, allow for charging even when a protective cover is placed over the watercraft, and can be oriented to more efficiently capture the sun if parked under shade, such as in a parking lot storage site.

SUMMARY OF THE INVENTION

Preferred embodiments are directed to solar panel assemblies for attachment to a boat trailer and comprising: a base plate configured to traverse along the length of a structural bar positioned near the front of the boat trailer and having means for coupling to said structural bar; a support stanchion having its lower end operably coupled to the upper surface of the base plate and a upper surface configured to support the base of a solar panel housing; wherein the solar panel housing, supports a first solar panel; and means for transmitting the power of the solar panel to a battery.

Additional embodiments are directed to boat trailers comprising: a back portion configured for receiving and releasing a boat; a middle portion configured to hold the boat while secured to said trailer; a front portion configured to couple to a towing vehicle, wherein the front portion is defined as the portion of the trailer in front of the foremost point of the boat when secured in the middle position of the trailer; a base plate configured to traverse along the length of a structural bar positioned in the front portion of the boat trailer and having means for coupling to said structural bar; a support stanchion having its lower end operably coupled to the upper surface of the base plate and a upper surface configured to support the base of a solar panel housing, wherein the solar panel housing supports a first solar panel; and means for transmitting the power of the solar panel to a battery.

BRIEF DESCRIPTION OF THE DRAWINGS

It will be appreciated that the drawings are not necessarily to scale, with emphasis instead being placed on illustrating the various aspects and features of embodiments of the invention, in which.

DETAILED DESCRIPTION OF THE ILLUSTRATED EMBODIMENTS

Embodiments of the present invention are described below. It is, however, expressly noted that the present invention is not limited to these embodiments, but rather the intention is that modifications that are apparent to the person skilled in the art and equivalents thereof are also included.

Figure 1:
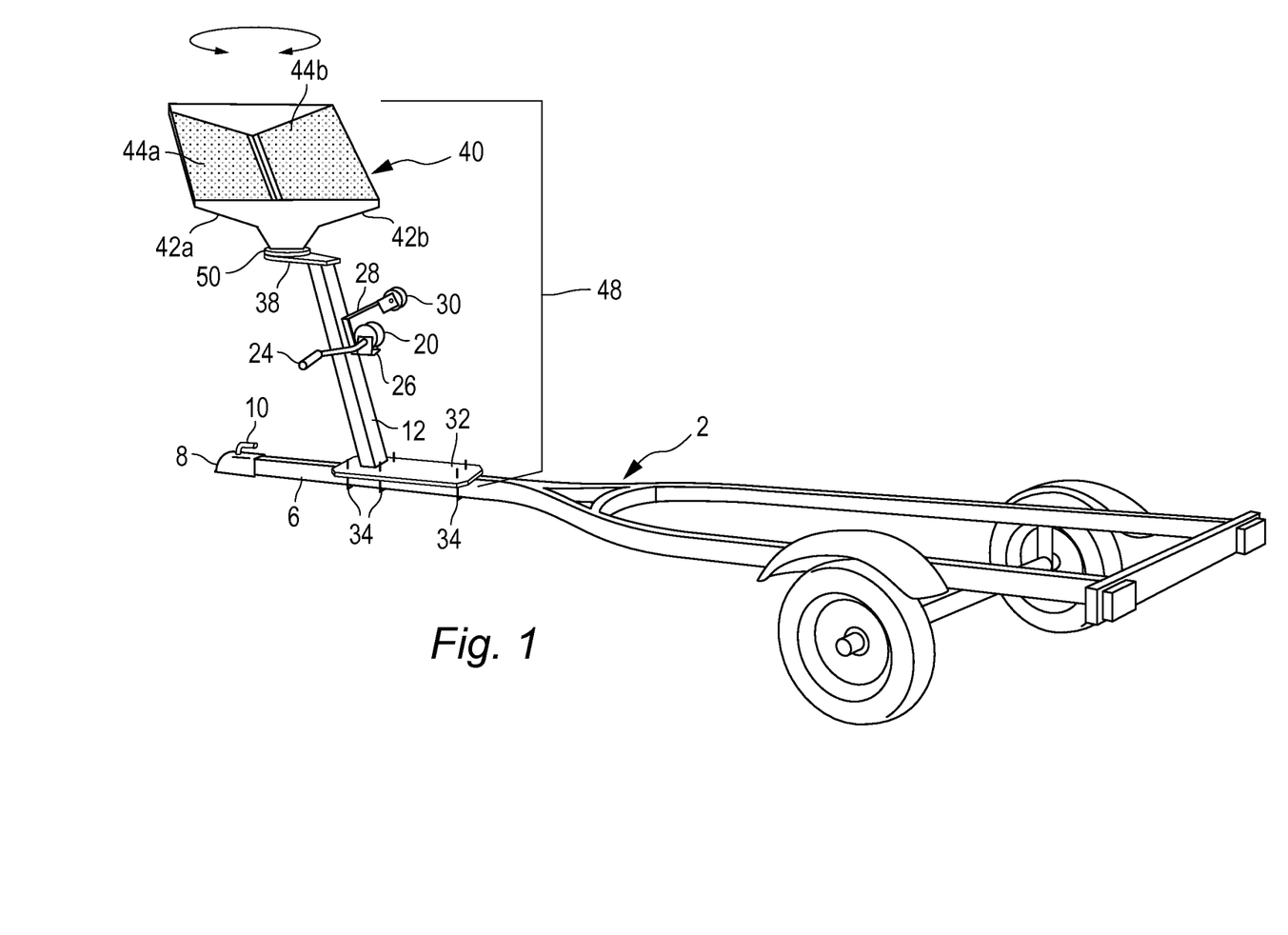
FIG. 1 is a perspective view of a solar panel assembly attached to a watercraft trailer.

FIG. 1 shows a boat trailer 2 configured to receive and release a watercraft through its back end and releasably couple to a towing vehicle with its front end. More specifically the boat trailer 2 can include a tongue 6 having a hitch coupler 8 and hitching lock 10 for coupling to a tow hitch on a towing vehicle, such as a truck or SUV, for example. The hitch coupler 8 can be complementary to any towing hitch on the towing vehicle, such as a ball hitch for example. The specific boat trailer 2 shown is expressly non-limiting and any suitable watercraft trailer can be used with the teachings herein. Examples of watercraft trailers can non-exclusively include boats, canoes, kayak, sailboats, and the like. The use of the term "boat" herein relates to any suitable watercraft.

Figure 2:
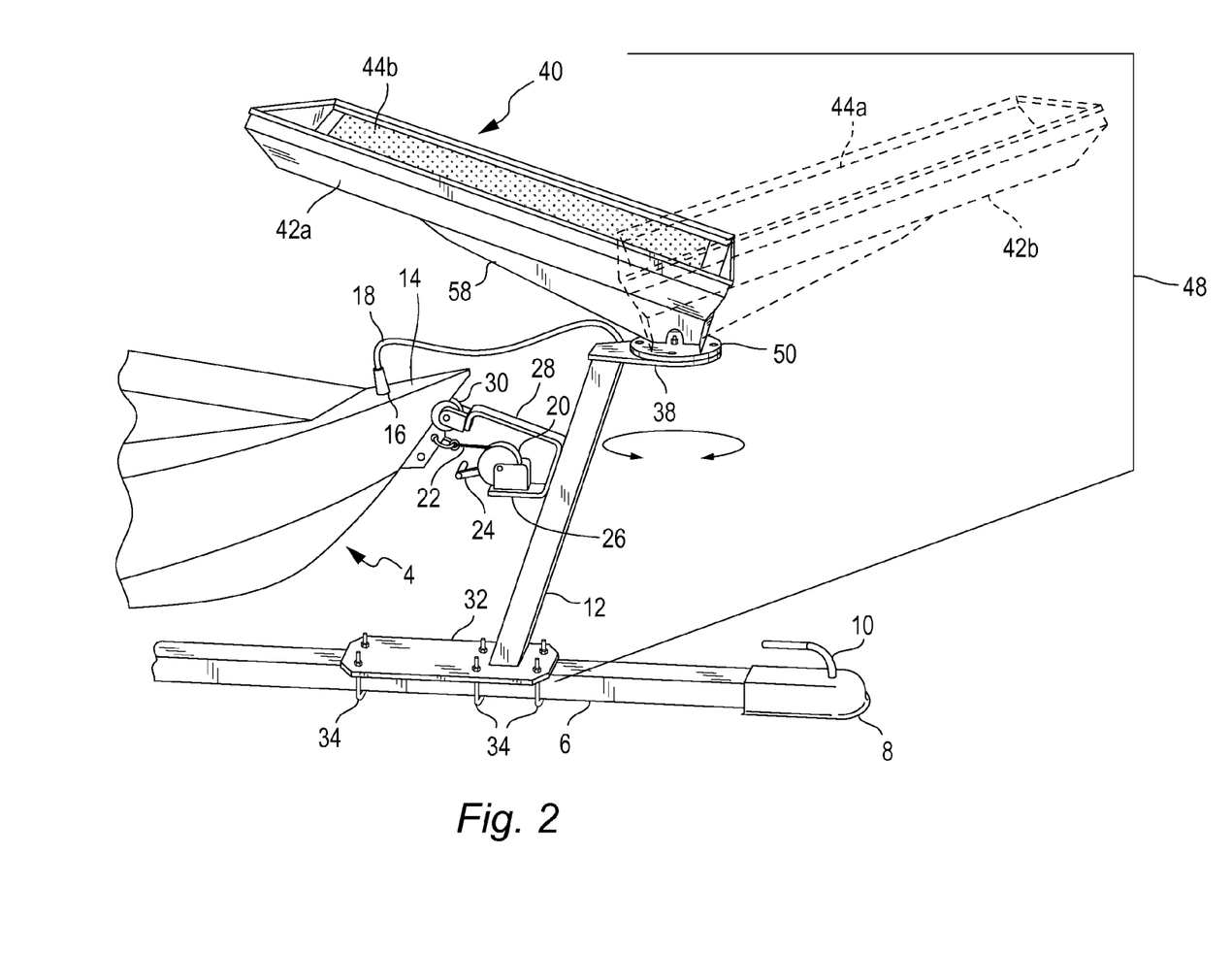
FIG. 2 is a perspective view of a solar panel assembly attached to a watercraft trailer.

Advantageously, the boat trailer 2 includes a solar panel assembly 48 configured to charge a battery, that can be within a watercraft or a reserve battery. FIG. 2 shows a close-up view of a solar panel assembly 48. In general, preferred solar panel assemblies include a base plate 32, a stanchion 12, and a solar panel housing 40. The base plate 32 supports the assembly 48 and includes means for coupling to the trailer 2. More specifically, the base plate 32 can advantageously be configured to couple to the tongue 6 of the trailer 2. Alternatively, the base plate can be configured to couple to a horizontal crossbar positioned near the front of the trailer (not shown) depending on the specific construction of the trailer. Accordingly, embodiments herein directed to the trailer tongue are expressly contemplated to also be used with crossbar embodiments.

Figure 7:
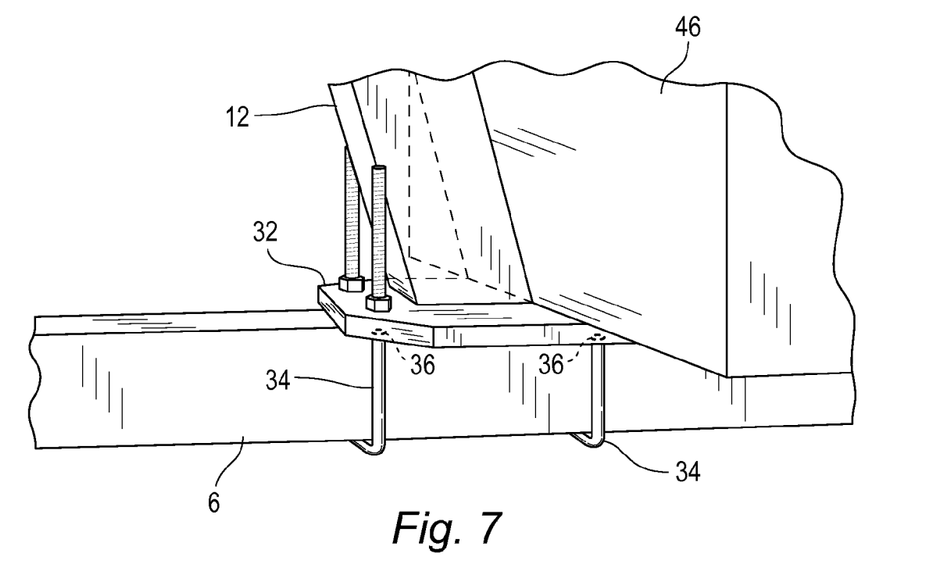
FIG. 7 is a close up view of a base plate coupled to a trailer tongue.
Figure 8:
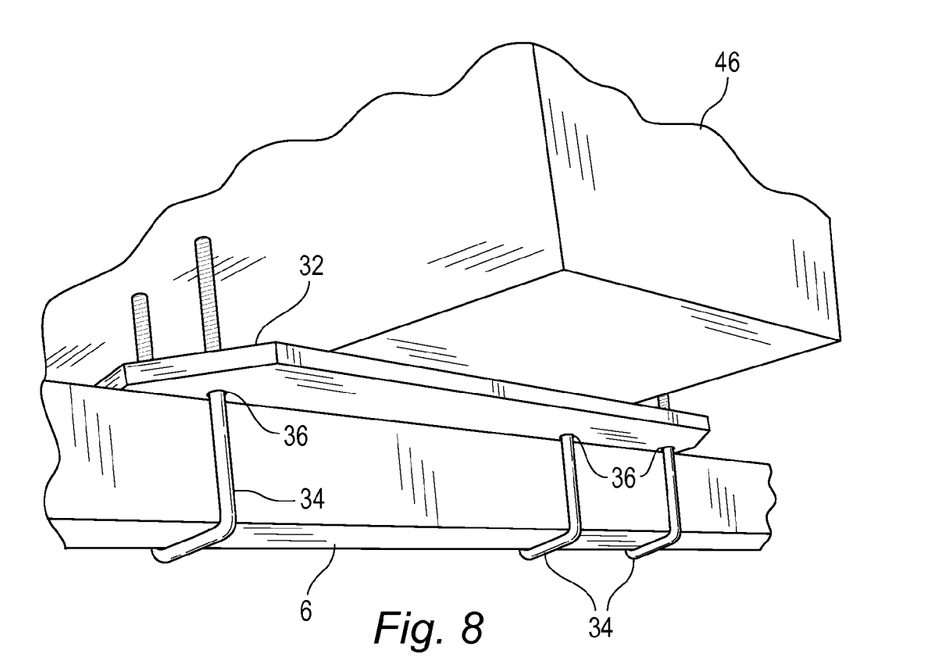
FIG. 8 is a close up view of an underside of a base plate coupled to a trailer tongue.
Figure 10:
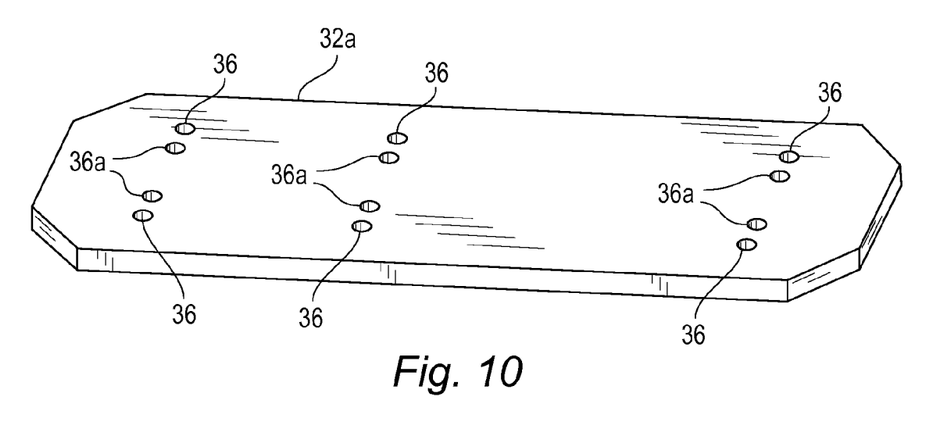
FIG. 10 is an alternative base plate configured to accompany different sized trailer tongues.
Figure 11:
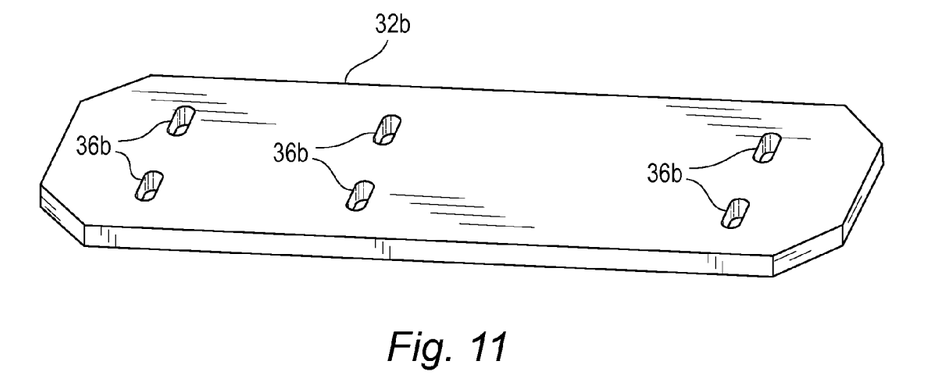
FIG. 11 is another alternative base plate configured to accompany different sized trailer tongues.

According to more specific embodiments, the base plate 32 can include means for releasable attachment to the tongue 6 of the trailer 2 such that it can be adjustably positioned along the length of the tongue 6 and secured at a desired position. Means for releasable attachment onto the tongue 6 of the trailer are advantageous in that the solar panel assemblies 48 provided herein can be coupled and removed from most boat trailers. As one example of means for releasable attachment, the base plate 32 can include a plurality of holes 36 configured to allow any suitable bolt, such as a U-bolt 34 to secure the base plate 32 to the tongue 6. FIGS. 7 and 8 provide close up views of U-bolts 34 securing the base plate 32 to the trailer tongue 6. As shown in FIGS. 7 and 8, the back side of the U-bolt 34 can be positioned against the underside the trailer tongue 6 such that the two prongs of the U-bolt 34 extend upwards through the holes 36 in the base plate 32. The U-bolts 34 can be tightened to the tongue 6 during attachment and loosened to release the base plate 32, such as when a user wants to either slide the solar panel assembly 48 along the length of the tongue 6 or to remove the assembly 48 completely. To accommodate different sized tongues 6 in different trailers, additional holes can be present in the base plate to allow for different sized U-bolts or other fastening means to secure the base plate to the tongue. As one example, FIG. 10, depicts a base plate 32a having outer holes 36 configured to receive a wider U-bolt for attachment to a wider tongue, and inner holes 36a to allow a narrower U-bolt to secure the base plate to a narrower tongue 6. As one example, the outer holes 36 can be used to secure the base plate 32a to a 4 inch wide tongue, while the inner holes 36a can allow attachment to a 2 inch wide tongue. Three, four, or more hole sets are also readily contemplated herein. As an alternative to utilizing multiple hole sets for incremental adjustment, the base plate 32b shown in FIG. 11 can include one or more sets of lateral slots 36b configured to receive suitable locking bolts and that allow for continuous adjustment to attach to different widths of tongues. Any suitable means for attaching the base plate 32 to the tongue 6 can be used with the teachings herein, non-exclusively including non-releasable attachment means such as welding, and releasable attachment means such as bolts, clamps, and screws, and the like, for example.

According to preferred embodiments, the base plate 32 is positioned at the front of the trailer 2 such that it is in front of the boat 4 when the boat 4 is secured to the trailer 2. According to further beneficial embodiments, the underside of the base plate 32 is planar, or substantially so, such that it can rest level on top of the tongue 6. The base plate 32 can run along the length of the tongue 6 of the trailer to any suitable distance as desired to provide sufficient support for the stanchion 12 and the solar panel housing 40. Preferably, the base plate 32 is made of a suitable material such as metal, and more preferably, aluminum or steel.

Figure 9:
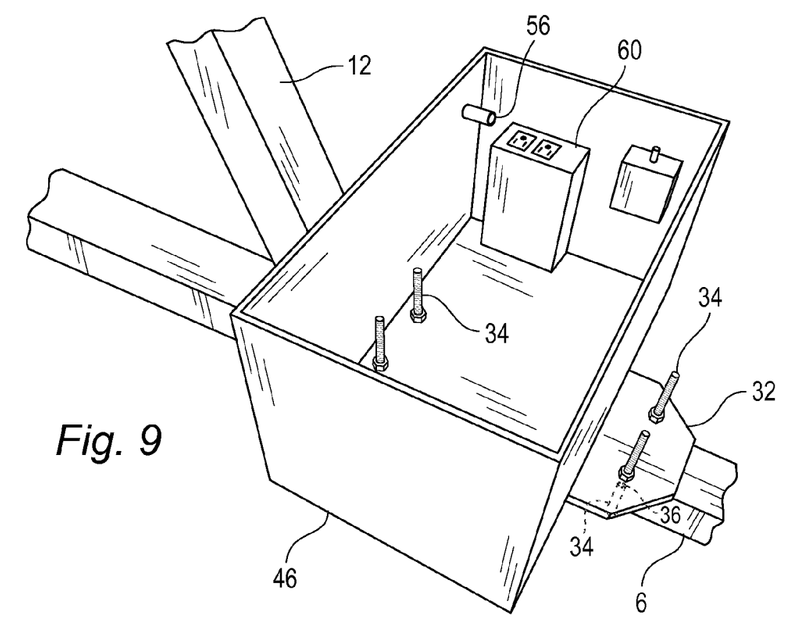
FIG. 9 is top view of an opened reserve battery box.

While FIGS. 1 and 2 show the trailers herein without a reserve battery housing, FIGS. 3, 6, and 7-9 show an optional reserve battery housing 46 coupled to the base plate 32. As shown in FIG. 9, any suitable bolt, such as a U-bolt 34 can be positioned under the tongue 6 such that its prongs are inserted through holes on the base plate 36 and through apertures on the bottom of the battery housing 46. Other suitable methods of fastening the battery housing 46 to the trailer 2 can be releasable, such as through the use of pins, bolts, clamps, and the like, or non-releasable such as through welding. These particular embodiments are expressly non-limiting as the reserve battery housing 46 can be positioned at other locations on the trailer 2, or even on the stanchion, and include any suitably shaped housing for holding a reserve battery 60. Preferably the reserve battery housing 46 includes sufficient space to charge one or more batteries, including the batteries used to power a boat 4 or car, or other batteries as well. More specifically the housing 46 can be configured to house a battery such as 12 or 24 volt battery that can optionally be used to power a boat 4. The use of a reserve battery 60 is advantageous in that it allows a user to charge the reserve battery 60 while the boat 4 is utilizing the power of the main battery. When the power is exhausted from the main battery, a user can simply install the reserve battery 60 into the boat 4 and place the main battery into the battery housing 46 to allow charging with the one or more solar panels 44a and 44b.

The battery housing 46 is preferably water proof or at least water resistant to protect the housed battery 60 and includes an opening, such as a lid for inserting and removing the battery 60. The battery housing 46 preferably includes a socket 56 for operably coupling the electrical cord 18 to the reserve battery 60. FIG. 9 shows an exemplary battery housing 46 opened to provide an internal view. The reserve battery 60 is preferably removably mounted within the housing 46 to prevent unnecessary movement, especially when the trailer 2 is being towed.

The lower portion of the stanchion 12 can be coupled to the base plate 32 using any suitable means such as welding, bolts, screws, clamps, and the like. Preferably the stanchion 12 extends upward from the base plate 32 and even more preferably at a forward angle, away from the secured boat and towards the towing vehicle. The height of the stanchion 12 can vary depending on the height and the length of the boat 4 being towed. Advantageously, the trailers and stanchions provided herein can work with boats between 8-28 feet in length, as an example. Furthermore, preferred ranges of stanchion height can be between 2-5 feet in height, for example. According to alternative embodiments, the stanchion can be telescoping to allow for variable height adjustment.

The body of the stanchion 12 can advantageously include any suitable winch 20 for pulling a boat 4 forwards on the trailer 2. As shown in FIG. 2, the winch 20 can include a cord 22 (e.g., wire, nylon fabric, rope) that can coil around a spool and uncoil outward and include means for coupling to the boat 4. Any suitable releasable coupling means can be used to attach the cord 22 to the bow of the boat 4 such as a carabineer or clip through a bow eye or bow hook. When the winch 20 is reeled in, the coupled boat 4 is pulled forward on the trailer 2. Likewise when the winch 20 is unreeled, the cord 22 is let out allowing for more slack such that the boat 4 can be slid off the back of the trailer 2, into the water. As one optional embodiment, the winch 20 can be mounted on top of a sufficiently strong winch bracket 26 that extends towards the back of the trailer 2. The winch 20 can be manually operated by a hand crank 24 or configured to utilize power. According to alternative embodiments, when a power winch is utilized, it can be operably coupled to the one or more solar panels 44a and 44b such as to receive its power source.

The stanchion 12 can also include a bow stop 30 that is preferably coupled to a horizontal extension 28 that is cantilevered towards the back of the trailer 2 and positioned above the winch 20. The bow stop 30 can be any suitable device for receiving the bow of the boat 4 when the winch 20 has pulled the boat 4 to its foremost position on the trailer 2. Non-exclusive examples of bow stops can non-exclusively include rollers, and padded V-shaped receiving members.

Figure 3:
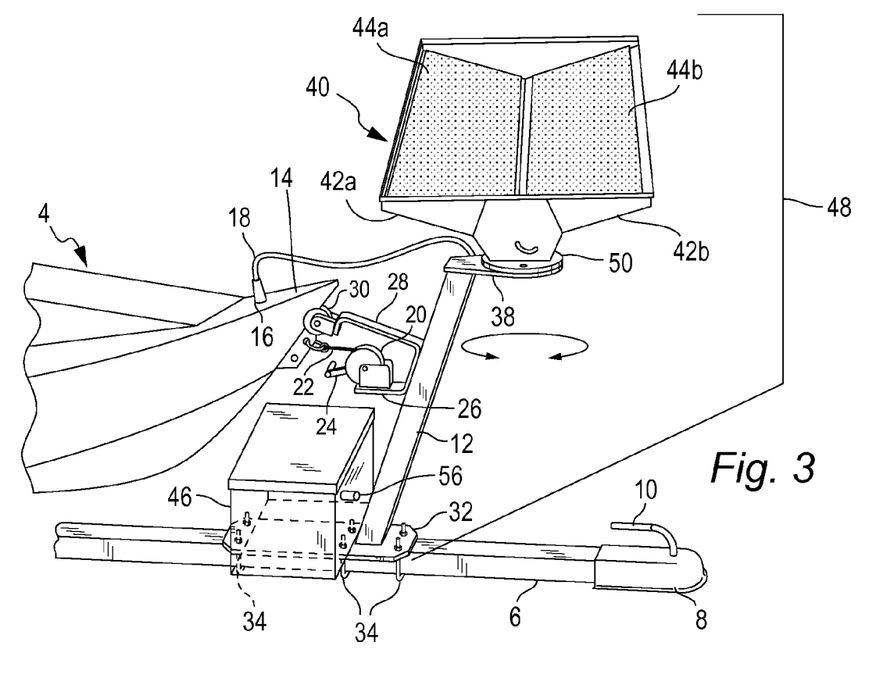
FIG. 3 is a perspective view of a solar panel assembly and a reserve battery box attached to a watercraft trailer.
Figure 5:
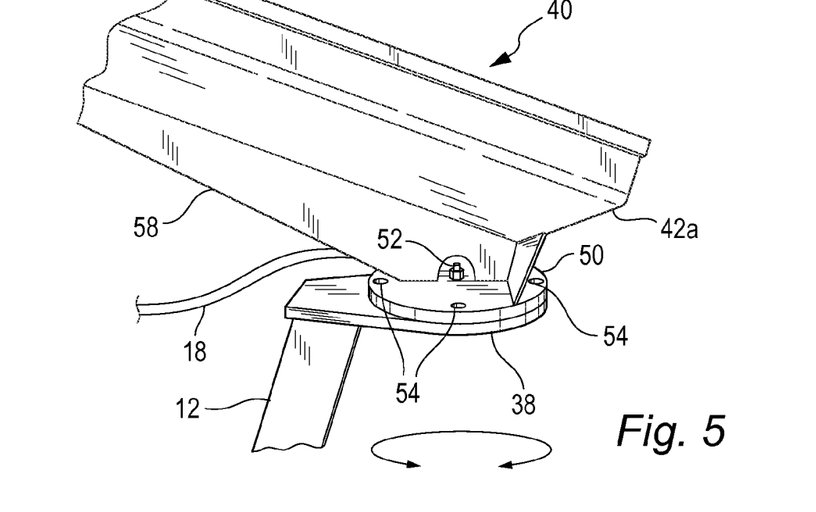
FIG. 5 is a close-up view of the base of a solar panel housing coupled to a housing mount.

The top portion of the stanchion 12 includes a housing mount 38 that supports the solar panel housing 40 above. The housing mount 38 preferably extends towards the front of the trailer 2 from the top of the stanchion 12 such that it is parallel with the tongue 6 of the trailer 2, or substantially so, although any suitable load bearing mount can be used to support the solar panel housing 40 above. Preferably, the housing mount 38 includes means for allowing the base 50 of the solar panel housing 40 to rotate around, preferably a full 360 degrees. As one example, FIG. 3 depicts the solar panel housing 40 rotated 90 degrees. The means for rotation can expressly be manual or automated. As one example, FIG. 5 depicts the circular base 50 of a solar panel housing 40 configured to be rotatable around a central screw 52 coupling the base 50 to the housing mount 38.

According to more specific embodiments, apertures 54 can be positioned through the base 50 at desired locations to allow a bolt, clamp, pin, or other stop device to secure the base 50, and thus the solar panel housing 40 at a desired position. FIG. 5 shows four apertures 54 at 90 degree intervals, although more or less apertures can be used as desired. For example, apertures can be positioned at every 45, 30, or 15 degrees of the housing base 50, for example. For embodiments directed to automated rotation of the base 50 of the solar panel housing 40, a motor can readily be used to automate the rotation of the housing 40 in accordance with the predicted sunlight path at the trailer 2 location. According to even more specific embodiments, the powered or automated means for rotation can be operably coupled to the one or more solar panels 44a and 44b such as to provide a power source. When the trailer 2 is being towed by a towing vehicle on roads, it is preferred for aerodynamic reasons to position the housing 40 in a travel position where it is cantilevered from its base 50 towards the boat 4, such that is parallel with the trailer tongue 6. The travel position of the solar panel housing 40 is shown in solid lines in FIG. 2. Alternatively, the housing mount can be configured to be rotatable along the top of the stanchion while the base of the housing base is configured to be stationary.

Figure 4:
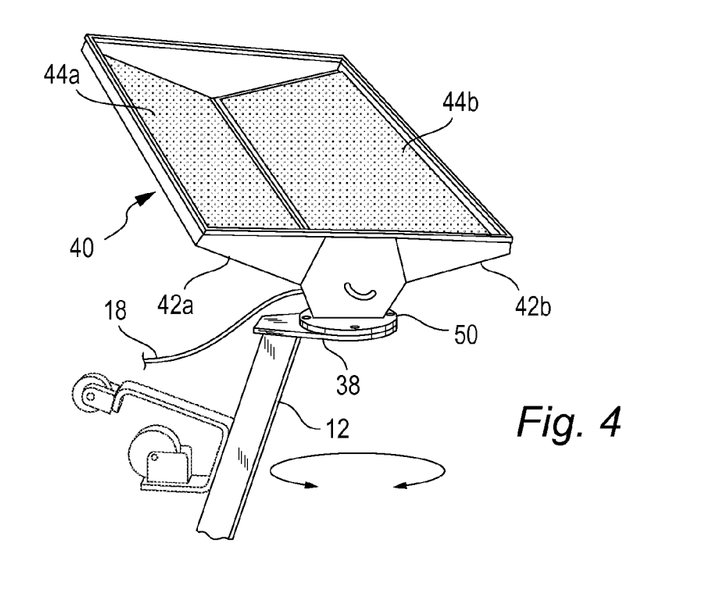
FIG. 4 is a top view of a solar panel housing holding two solar panels.
Figure 6:
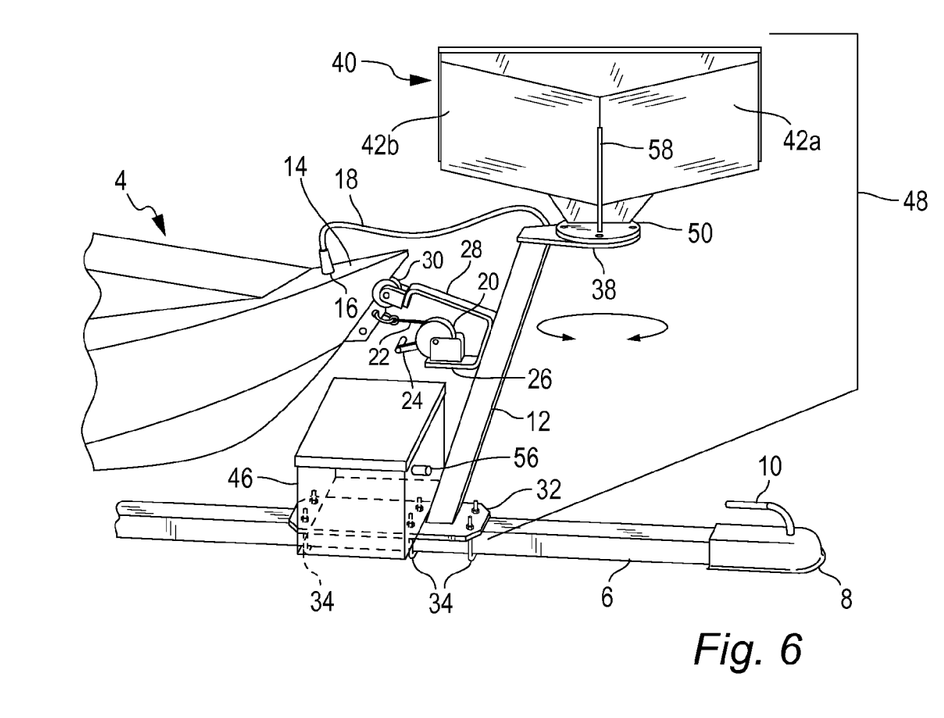
FIG. 6 is an underside view of a solar panel housing.

As shown in FIGS. 4 and 6, the solar panel housing 40 is supported by its base 50 positioned on top of the housing mount 38. Additionally, the body of the solar panel housing 40 can advantageously include downwardly slanting left and right sides 42a and 42b that help protect the one or more housed solar panels 44a and 44b from road debris when the trailer 2 is being towed. The downwardly slanting right and left sides 42a and 42b can also act to increase the aerodynamic properties of the housing 40. According to certain embodiments, the downwardly slanting sides can terminate at a bottom section such as rectangular-shaped, or otherwise planar bottom, such that the housing is in the general shape of a trough, for example (not shown). According to this embodiment, the front and back sides of the housing can be in the general shape of trapezoid, or substantially so. Alternatively, a preferred solar panel housing 40 includes two downwardly converging sides 42a and 42b that form a V-shaped cross-section. According to this embodiment, the front and back sides of the housing 40 can be in the general shape of a triangle, or substantially so. Advantageously a bottom fin 58 can traverse alongside the underside of the housing 40, such as along the border where the two sides 42a and 42b converge. The bottom fin 58 can include a wider portion secured to the housing base 50 such that it tapers upward along the converging border of the two sides 42a and 42b, such as in the shape of a triangle, for example. Preferably, the housing 40 is constructed of a rigid structural material, such as metal, and more preferably aluminum and/or steel. According to non-preferred embodiments, any suitably shaped solar panel housing can be used with the teachings herein.

Figure 12:
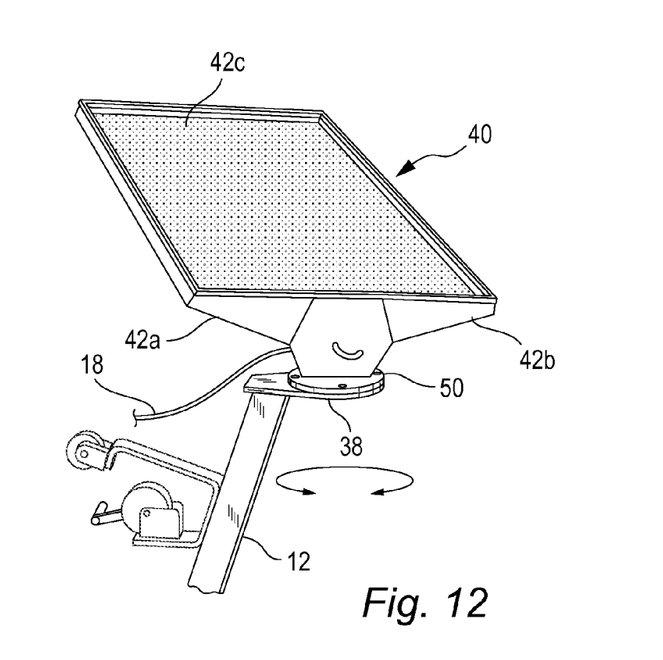
FIG. 12 is an alternative solar panel housing configured to hold a single solar panel.

FIG. 4 shows a preferred embodiment wherein right and left solar panels 44a and 44b are positioned within the solar panel housing 40. More specifically, the solar panels 44a and 44b are respectively installed on the inner faces of the right and left converging sides 42a and 42b of the housing 40. This particular configuration is advantageous in that the solar panels 44a and 44b are more protected from road debris by the slanted sides 42a and 42b. The arrangement and number of solar panels shown in FIG. 4, is expressly non-limiting, as preferred housings described herein can include a single panel or more than 1 panel. As another example, FIG. 12 depicts the housing 40 having a single solar panel 42c that is installed level or substantially level across the two slanted sides 42a and 42b. It is preferred under this particular embodiment, to have the solar panel 42c slightly recessed within the housing 40 to still allow the slanted sides 42a and 42b to offer protection from road debris. Accordingly to other embodiments, 3, 4, 5, 6, or more solar panels can be used with the housing described herein having any suitable shape or patterned configuration.

Any suitable solar panels can be used with the teachings herein. Preferably the solar panels as a collection can provide power to a boat 4 having a battery. Boat batteries that fully power the motor of the boat and batteries for sail and gas operated boats are also readily contemplated herein. In particular, the one or more solar panels 44a and 44b are preferably configured to fully charge a 12 or 24 volt battery. Optionally, the solar panels can also power a power winch 20, and means for rotating the solar power housing 40. According to further embodiments, the one or more solar panels 44a and 44b can also power portable electronic devices, such as devices useful in camping and during an emergency, including low voltage lighting, pumps, laptops, microwaves, water filtration systems, radios, cell phones, televisions, generators and the like, for example.

Means for coupling the one or more solar panels 44a and 44b to the boat 4 are preferably present in the solar panel housing 40. FIG. 3 depicts an electrical cord 18 having a first end operably coupled to the solar panels 44a and 44b and a second end have means for operably coupling to a socket in communication with a battery. As one example, shown in FIG. 3, the forward deck 14 of the boat 4 can include a socket 16 for receiving the second end of the electrical cord 18. Preferably the second end of the electrical cord 18 and/or the socket 16 are adapted to be waterproof or at least water resistant with the use of gaskets, caps, or rubber housings, for example. The socket 16 in the boat is preferably in operable communication with the boat's battery and can be positioned in any suitable spot on the boat, such as on either the port or starboard side, or bow of the boat as well. These mentioned positions are disadvantageous as in they expose the socket unnecessarily to water. As the solar panel housing 40 is positioned on the front of the trailer 2, it is preferred that the boat's socket is on the forward deck, not on the bow or sides, and is not present near the aft of the boat, otherwise an unnecessarily long electrical cord would be utilized. For non-preferred embodiments, where a battery or socket is located near the aft of a boat, a long electrical cord can be used or extension cords and/or alligator clips can be used to elongate the electrical cord 18. For embodiments, wherein the solar panels power the winch and/or rotating means, these devices can also include sockets for receiving the second end of the electrical cord 18, or alternatively, more than one electrical cord in operable communication with the solar panels can be used.

Advantageously, the electrical cord 18 is sufficiently long enough to be plugged into the socket 16 of the boat 4 while allowing the solar panel housing 40 to be rotatable 360 degrees around the top of the stanchion 12. Additionally, it is preferred that the electrical cord 18 is sufficiently long to reach the socket 56 within the reserve battery housing 46 and still allow 360 rotation of the solar panel housing 40 around the top of the stanchion 12.

The invention may be embodied in other specific forms besides and beyond those described herein. The foregoing embodiments are therefore to be considered in all respects illustrative rather than limiting, and the scope of the invention is defined and limited only by the appended claims and their equivalents, rather than by the foregoing description.

The invention claimed is:

1. A solar panel assembly for attachment to a boat trailer comprising:
   a base plate configured to traverse along the length of a structural bar positioned near the front of the boat trailer and having means for coupling to said structural bar;
   a support stanchion having its lower end operably coupled to the upper surface of the base plate and a upper surface configured to support the base of a solar panel housing; wherein the solar panel housing, supports a first solar panel;
   means for transmitting the power of the solar panel to a battery;
   wherein the base of the solar panel housing is configured to rotate around the upper surface of the stanchion, thereby rotating the supported solar panel housing, such that the base of the solar panel housing and the solar panel housing are configured to rotate 360 degrees around the upper surface of the stanchion.

2. The solar panel assembly of claim 1, wherein the base of the solar panel assembly includes means for temporarily stopping the rotation around the upper surface of the stanchion at specified degrees.

3. A boat trailer comprising:
   a back portion configured for receiving and releasing a boat;
   a middle portion configured to hold the boat while secured to said trailer;
   a front portion configured to couple to a towing vehicle, wherein the front portion is defined as the portion of the trailer in front of the foremost point of the boat when secured in the middle position of the trailer;
   a base plate configured to traverse along the length of a structural bar positioned in the front portion of the boat trailer and having means for coupling to said structural bar;
   a support stanchion having its lower end operably coupled to the upper surface of the base plate and a upper surface configured to support the base of a solar panel housing, wherein the solar panel housing supports a first solar panel;
   an electrical cord for transmitting the power of the solar panel to a battery, and having sufficient length to plug into a boat secured in the middle portion of the trailer;
   a reserve battery housing configured to releasably hold a reserve battery and couple to the base plate, wherein the electrical cord has sufficient length to plug into the reserve battery housing such as to operably couple to the internal reserve battery; and
   wherein the base of the solar panel housing is configured to rotate around the upper surface of the stanchion, thereby rotating the supported solar panel housing, such that the base of the solar panel housing and the solar panel housing are configured to rotate 360 degrees around the upper surface of the stanchion and the electrical cord is sufficiently long enough to stay plugged into the secured boat and the reserve battery housing during rotation.

* * * * *